(12) United States Patent
Rhee

(10) Patent No.: US 11,643,019 B2
(45) Date of Patent: May 9, 2023

(54) FRONT CONSOLE MULTI-POSITION DEVICE HOLDER

(71) Applicant: TOYOTA MOTOR ENGINEERING & MANUFACTURING NORTH AMERICA, INC., Plano, TX (US)

(72) Inventor: Que-Whang Rhee, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 126 days.

(21) Appl. No.: 17/190,933

(22) Filed: Mar. 3, 2021

(65) Prior Publication Data

US 2022/0281386 A1    Sep. 8, 2022

(51) Int. Cl.
*B60R 7/04* (2006.01)
*B60R 16/03* (2006.01)

(52) U.S. Cl.
CPC ............. *B60R 7/04* (2013.01); *B60R 16/03* (2013.01)

(58) Field of Classification Search
CPC ................................. B60R 7/04; B60R 16/03
USPC .................. 296/24.34, 37.1, 37.12, 1.07
See application file for complete search history.

(56) References Cited

U.S. PATENT DOCUMENTS

| | | | | |
|---|---|---|---|---|
| 8,145,821 B2 * | 3/2012 | Mead | ................... | G06F 1/1632 361/679.55 |
| 9,205,753 B2 * | 12/2015 | Winget | ................ | H02J 7/0044 |
| 9,434,319 B2 * | 9/2016 | Oldani | ...................... | B60R 7/06 |
| 9,468,122 B2 * | 10/2016 | Woodward | .............. | F21V 21/00 |
| 10,086,771 B2 * | 10/2018 | Barre | ..................... | F16M 13/00 |
| 10,155,483 B2 * | 12/2018 | Catlin | ................ | B60R 11/0241 |
| 10,391,950 B2 * | 8/2019 | Vander Sluis | .......... | B60R 11/02 |
| 10,576,905 B1 * | 3/2020 | MacNeil | .............. | H04B 1/3888 |
| 10,836,326 B1 * | 11/2020 | Yang | .................... | H04B 1/3877 |
| 10,967,807 B1 * | 4/2021 | Hessheimer | ........ | B60R 11/0241 |
| 11,192,486 B2 * | 12/2021 | Chen | ....................... | H02J 7/025 |
| 2007/0087725 A1 * | 4/2007 | Anderson | ............ | H04B 1/3816 455/348 |
| 2010/0134984 A1 * | 6/2010 | Lum | ....................... | H04M 1/04 361/725 |
| 2018/0001835 A1 * | 1/2018 | Corso | ................. | B60R 11/0241 |
| 2019/0126843 A1 * | 5/2019 | Bouchard | .............. | G01S 19/14 |

FOREIGN PATENT DOCUMENTS

| | | |
|---|---|---|
| CN | 209700545 | 11/2019 |
| EP | 3177486 B1 | 9/2018 |
| WO | 2016200942 A1 | 12/2016 |

* cited by examiner

*Primary Examiner* — D Glenn Dayoan
*Assistant Examiner* — E Turner Hicks
(74) *Attorney, Agent, or Firm* — Sheppard, Mullin, Richter & Hampton LLP; Hector A. Agdeppa; Daniel N. Yannuzzi

(57) ABSTRACT

A multi-position device holder is provided for holding one or more mobile devices in a vehicle interior in a center console/console assembly. The multi-position device holder may accommodate one or more mobile devices used/placed on the multi-position device holder in various orientations. A platform of the multi-position device holder provides multiple angular orientations of one or more mobile devices, to accommodate different charging mechanisms (wireless and corded), as well as provide increased stability/retention of one or more mobile devices.

15 Claims, 6 Drawing Sheets

FRONT CONSOLE MULTI-POSITION DEVICE HOLDER

TECHNICAL FIELD

The present disclosure relates generally to vehicle interiors, and more particularly, to a multi-positional portable electronic device holder/charger.

DESCRIPTION OF RELATED ART

The interior/occupant compartment of a vehicle (automobiles, watercraft, aircraft, etc.) is often provided with various compartments for the storage of items during operation or other use of the vehicle. The most well-known of these compartments is the glovebox or glove compartment. More recently, console assemblies have been provided in vehicles that can include a lid that is hinged at one end and opens at another end so as to permit access into a storage area defined within the console assemblies. Other console assemblies may have storage areas with sliding access, side access, etc. With the above-noted compartments, the console lid or glovebox door allows for any articles placed therein to be concealed from view from outside of the vehicle. Alternatively, various open-topped bins or trays may be provided within vehicles to allow for the placement of an article(s) therein without necessarily concealing the article.

Increasingly, vehicle occupants rely upon mobile devices, such as mobile phones, in their everyday lives. Mobile phones are generally placed within open bins or trays while a vehicle is being operated and when the device is not in use. One inconvenience of placing a mobile device in these trays or bins is that the device often moves around during operation of the vehicle, possibly resulting in wear and damage to the housing of the device, or more undesirably, the display screen of the device.

BRIEF SUMMARY OF THE DISCLOSURE

In accordance with one embodiment, a vehicle console assembly, comprising: a device holder, comprising: a dual-position platform atop which one or more mobile devices rest; a back rest abutting at least one edge of the dual-position platform against which a rear surface or edge of the one or more mobile devices rests; and at least two channels of the dual-position platform through which one or more cords, when connected to the one more mobile devices, are routed.

In some embodiments, a first edge of the dual-position platform is canted towards the back rest.

In some embodiments, the dual-position platform comprises a first sub-platform configured to angle the one or more mobile devices such that at least one surface of the one or more mobile devices abuts the back rest. In some embodiments, a first section of the back rest includes wireless charging circuitry adapted to wirelessly charge one of the one or more mobile devices when the at least one surface of the one or more mobile devices abuts the first section of the back rest. In some embodiments, the dual-position platform comprises a second sub-platform configured to angle the one or more mobile devices such that a side edge of the one or more mobile devices touches the back rest. In some embodiments, at least one of the at least two channels maintains alignment of the one or more cords when connected to the one or more mobile devices. In some embodiments, the angle at which the side edge of the one or more mobile devices touches the back rest resulting from placement of the one or more mobile devices atop the second sub-platform is greater than an angle at which the at least one surface of the one or more mobile devices abuts the back rest resulting from placement of the one or more mobile devices atop the first sub-platform.

In some embodiments, the vehicle console assembly further comprises a divider rib positioned between the first section of the back rest and a second section of the back rest stabilizing placement of the one or more mobile devices on the device holder.

In some embodiments, the vehicle console assembly further comprises side stabilizers positioned at a respective outer edge of each of the first and second sections of the back rest, parallel with the divider rib.

In accordance with another embodiment, a device holder comprises: a canted platform atop which one or more mobile devices rest; a back rest abutting at least one edge of the canted platform; two channels of the canted platform, each of the two channels accommodating passage of a cord operatively connected to one of the one or more mobile devices; and a divider rib subdividing the back rest into two sub-sections.

In some embodiments, the canted platform comprises a first sub-platform comprising a channel in which the one or more mobile devices rests in either portrait or landscape orientations. In some embodiments, the two channels are disposed proximate to the first sub-platform to accept the passage of the cord when the one or more mobile devices rest atop the first sub-platform. In some embodiments, the canted platform comprises a second sub-platform positioned between the back rest and the first sub-platform. In some embodiments, a relative angle of the first sub-platform is different than a relative angle of the second sub-platform.

In some embodiments, at least one of the two sub-sections supports wireless charging via wireless charging circuitry embedded in the device holder.

In some embodiments, the device holder further comprises a plurality of side stabilizers positioned on either side of the divider rib at outer edges of the two sub-sections.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
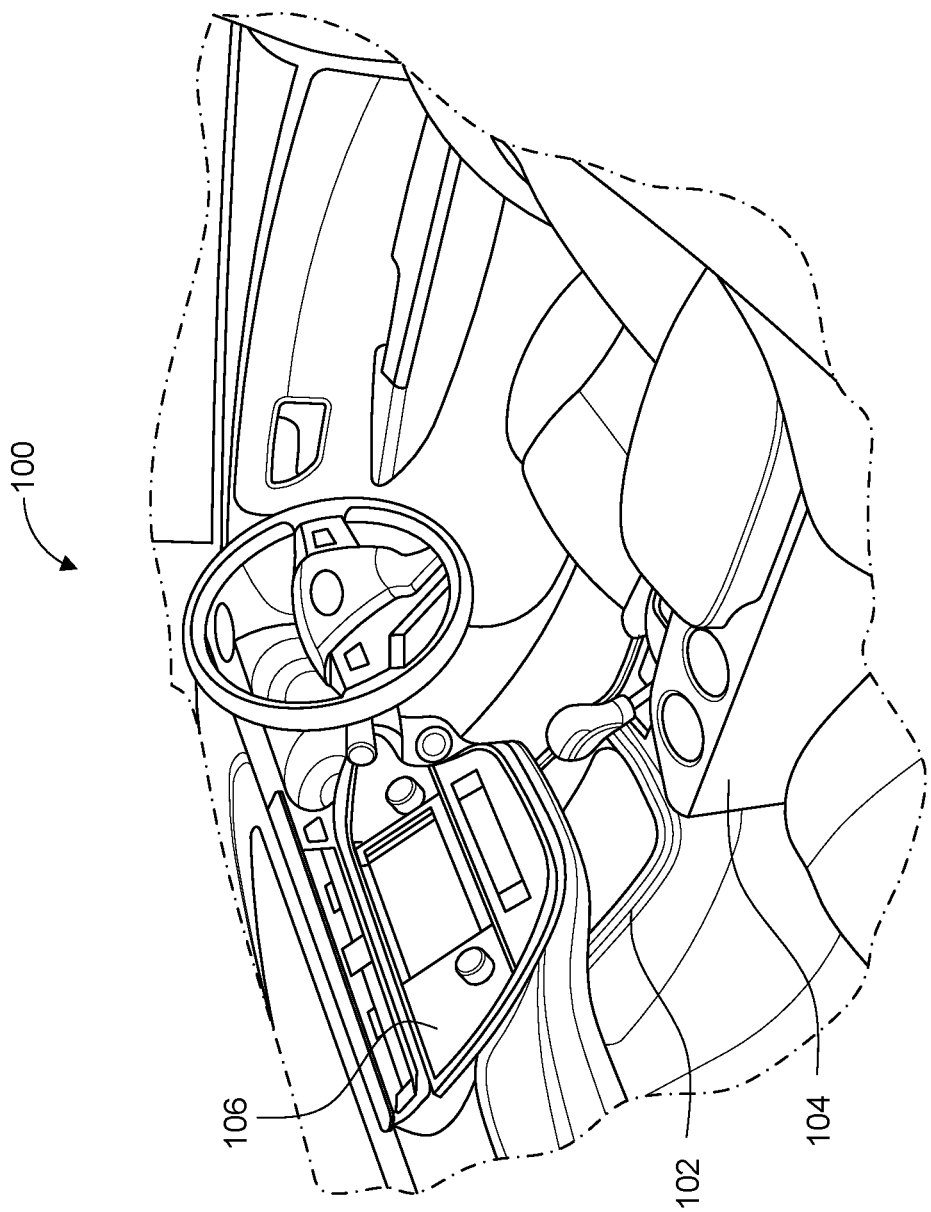
FIG. 1 is a schematic representation of an example vehicle interior compartment in which embodiments of the systems and methods disclosed herein may be implemented.

The figures are not exhaustive and do not limit the present disclosure to the precise form disclosed.

DETAILED DESCRIPTION

As alluded to above, current/conventional vehicular device holders, such as conventional front or center console trays or areas are often ill-equipped to provide stability to mobile devices held by such conventional device holders. Current/conventional device holders are also often incapable of providing a platform or mount that effectuates easy access to mobile devices while holding such mobile devices with better stability. Such inadequacies with the current/conventional console device holders can be inconvenient, such that use of mobile devices is eschewed, or at the very least, is sub-optimal. For example, traditional horizontal surfaces on which mobile devices may rest result in mobile devices easily sliding around. When such traditional horizontal surfaces include wireless charging capability, this movement often causes mobile devices to shift off/away from the charging coils incorporated within such surfaces. Further still, a mobile device that is not securely retained can fly up/out of its holder/holding area during vehicle operation, becoming a physical hazard to vehicle occupants.

It should be noted that certain third-party device holders have been developed that can be attached to various parts/elements of a vehicle's interior, e.g., HVAC vents, integrated into existing console holders for other devices/objects, e.g., holders that fit into a cup holder. However, being third-party device holders, their design/aesthetics may not necessarily match that of the vehicle's interior. Additionally, functionality of the center or front console may be lost, e.g., in the case of a third-party device holder taking the place of a cup holder, and attachment of such third-party device holders to vents (or other elements) may also be unsecure, aesthetically unpleasing, etc.

Accordingly, embodiments of the present disclosure are directed to a multi-position device holder integrated into or placed into/atop a front/center console of a vehicle. The multi-position device holder may comprise a canted platform that allows one side or edge of a mobile device, such as a mobile phone, to rest atop the canted platform. The canted platform may be configured to have multiple angles at which a mobile device held or placed thereon may rest. The multiple angles are provided to accommodate both wired/corded charging as well as wireless charging.

The multi-position device holder may further include channels integrated into one or more sections of the canted platform to provide cords connected to a mobile device with an ingress/egress area. This prevents awkward/damaging positioning of a cord when it is plugged into a mobile device. Further still, the multi-position device holder may be configured with a divider rib that can provide stability to one or more mobile devices in one or more orientations, e.g., portfolio (upright) as well as landscape (sideways).

Referring now to the drawings, FIG. 1 illustrates an example vehicle interior 100 that may include a console assembly 102. The console assembly 102 may be part of a front or center console 104, a console that is centrally located in the cabin/interior of vehicle 100. As illustrated in FIG. 1, the center console 104 may extend longitudinally relative to the length of vehicle 100, and the console assembly 102 itself may be positioned at the forward end of the center console 104, such that is located at least partially beneath an instrument panel 106. As will be apparent from the description which follows, the console assembly 102 could be formed as a separate component from the center console 104 or could be formed as part of the instrument panel 106. Additionally, the center assembly 102 could be positioned so as to be wholly beneath the instrument panel 106 or completely apart therefrom.

Figure 5:
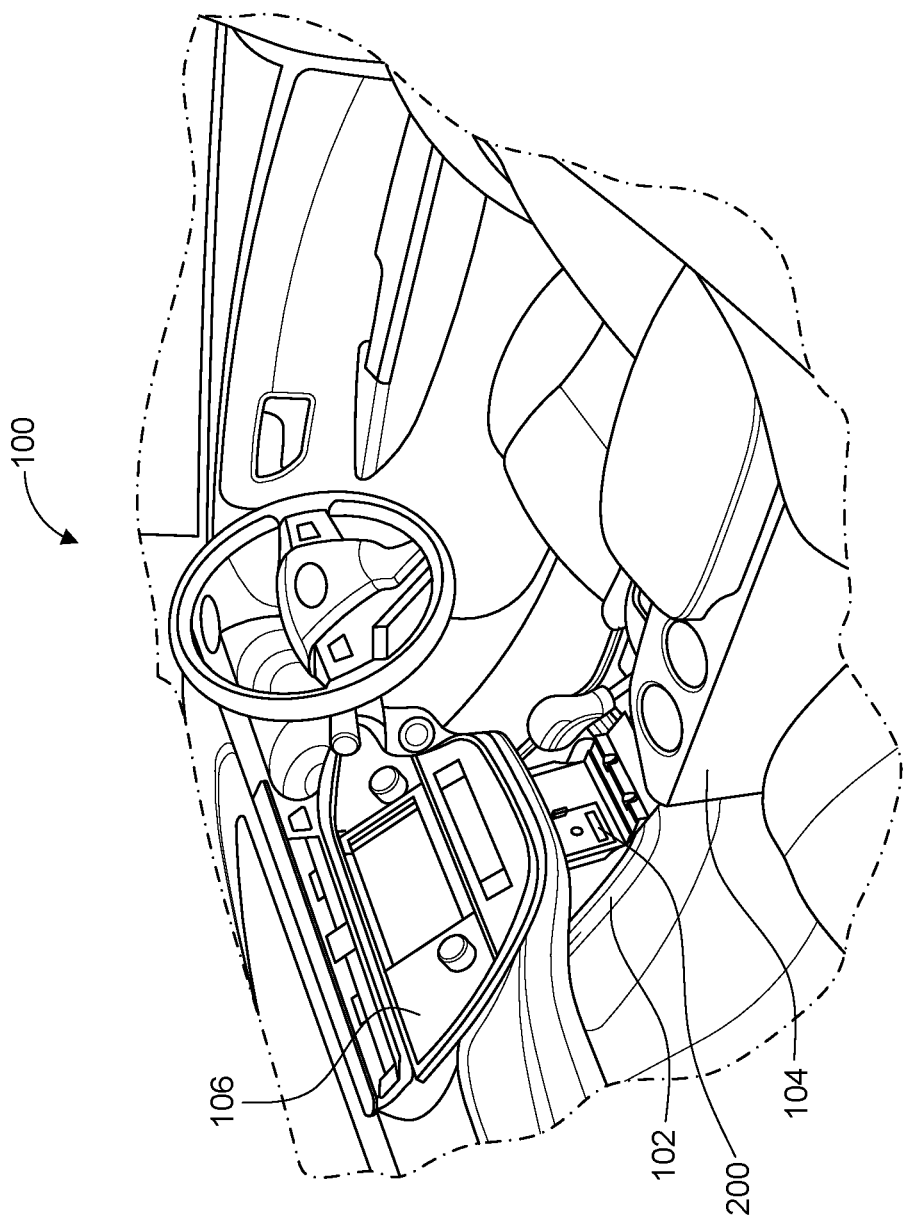
FIG. 5 is a schematic representation of an example vehicle interior compartment in which one example of the multiple-position device holder is implemented in accordance with one embodiment.

FIG. 5 illustrates an example configuration of console assembly 102 of vehicle interior 100, which includes an embodiment of multi-position device holder 200. Again, the particular size/dimension of multi-position device holder 200 (or one or more elements or components thereof may vary in accordance with different embodiments) to accommodate different mobile device sizes, types of mobile devices, size or configuration of console assembly 102, and so on. As alluded to above, multi-position device holder 200 may be integrated into/designed to be part of console assembly 102 during manufacturing of vehicle interior 100. In other embodiments, multi-position device holder 200 may be an "insert" that can be attached or otherwise later-integrated into or used with console assembly 102.

As used herein, directional indications such as forward, rearward, upward and downward are to be interpreted relative to an automotive vehicle. Accordingly, the forward direction refers to a direction toward the front end of the vehicle. Rearward, upward and downward directions are thus similarly defined as directions toward the rear, top and bottom, respectively, of the vehicle.

Figure 2A:
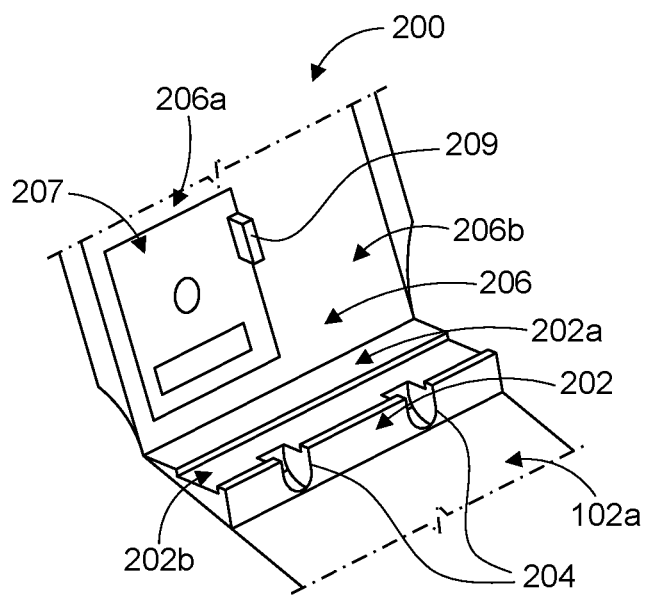
FIG. 2A is a perspective view of an example multi-position device holder in accordance with one embodiment.

Referring now to FIG. 2A, which is a front perspective view of a multi-position device holder 200, it can be appreciated the multi-position device holder 200 may comprise a canted or tilted platform 202. For example, as illustrated in FIG. 2A, platform 202 may be canted downwards towards a base of platform 202 where it connects or coincides with a back rest 206 of multi-position device holder 200.

Back rest 206 may be configured or sized to accommodate multiple devices if need be. For example, two mobile devices, e.g., mobile phones may be held by multi-position device holder 200, when held in their respective portrait orientations. One mobile device may be held relative to a first section or area 206a of back rest 206, while another mobile device may be held relative to a second section or area 206b of back rest 206. As also illustrated in FIG. 2A, wireless charging circuitry 207 may be included within or on a surface of at least one portion or section of back rest 206, in this embodiment, relative to section 206a of back rest 206. It should be understood that in other embodiments, wireless charging circuitry can be provided in both the first and second sections 206a and 206b of back rest 206. In some embodiments, wireless charging circuitry need not be provided at all. In some embodiments, multi-position device holder 200 may only have a single angled platform, e.g., sub-platform 202a or 202b (described in greater detail below). In some embodiments, even if wireless charging circuitry is not provided, sub-platforms 202a and 202b may nevertheless be provided. It should be noted that in due to the more horizontal positioning of a mobile device when resting atop sub-platform 202b, stability may be greater relative to certain vehicular movement/motion, e.g., forward/rearward motion.

Multi-position device holder 200 may further comprise a divider rib 209 that can be positioned substantially between sections 206a and 206b of back rest 206. Given the differing dimensions of mobile devices, such as mobile phones, one of sections 206a and 206b may be sized or configured to accommodate a larger mobile device, while the other of sections 206a and 206b can accommodate a smaller mobile device. Accordingly, divider rib need not necessarily divide back rest 206 precisely in half—other configurations are possible and contemplated. Moreover, the shape, positioning, or size of divider rib 209 may vary to accommodate different mobile devices, or available space within console assembly 102, for example. In some embodiments, the shape, size, and positioning of divider rib 209 is such that it can provide a level of frictional contact allowing it to maintain stability of one or more mobile devices contacting divider rib 209.

In some embodiments, divider rib 209 may be sized such that, as noted above, multiple mobile devices, e.g., two mobile phones, may fit alongside each other while being held in their respective portrait orientations by multi-position device holder 200. As will be described in greater detail below, some embodiments contemplate accommodating at least one mobile device while in its landscape orientation. Accordingly, divider rib 209 may be further configured and sized to provide space to accommodate such a mobile device. In some embodiments, divider rib 209 may be formed from/out of back rest 206. In other embodiments, divider rib 209 may be a separately manufactured element that can be fixedly attached to back rest 206, e.g., an outer surface of back rest 206, through connection apertures on back rest 206 configured to accept, e.g., connection tabs (not shown) of divider rib 209. One of ordinary skill in the art would understand a variety of ways/mechanisms by which divider rib 209 can be formed or attached.

Multi-position device holder 200 may further comprise charging or connection cord/cable/wire channels 204. In some embodiments, such a channel 204 is provided for each of sections 206a and 206b to accommodate connection to mobile devices being held in those respective sections.

Figure 2B:
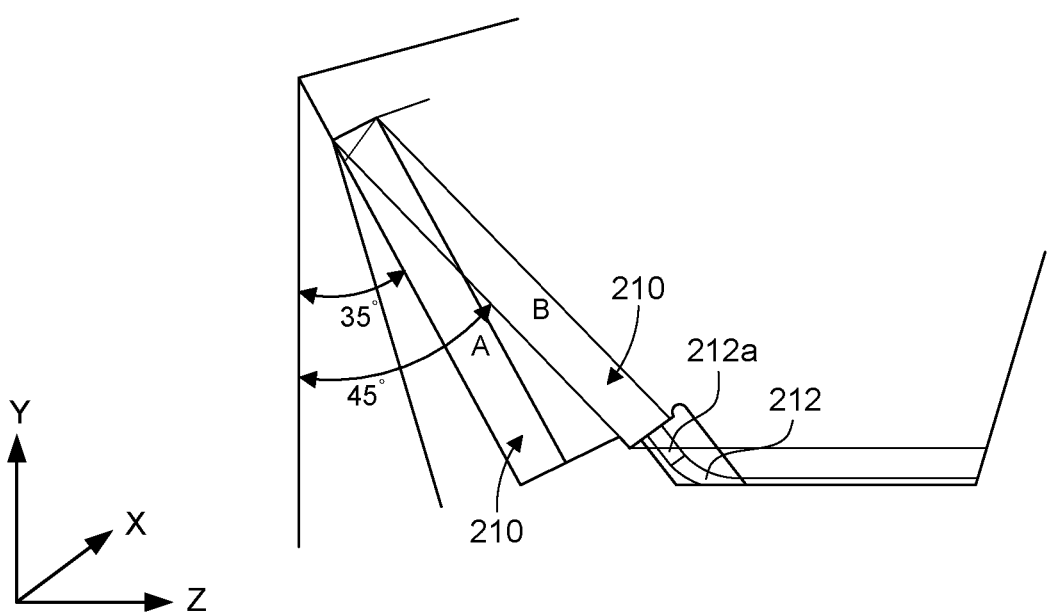
FIG. 2B is a side view of the example multi-position device holder of FIG. 2A.

Referring to FIG. 2B, which is a side view of multi-position device holder 200, the tilted aspect of platform 202 may be better appreciated. As illustrated in FIG. 2B, the tilting or canting of platform 202 results in one or more angles relative to vertical axis y, which may be perpendicular to surface 102a of console assembly 102, e.g., a conventional horizontal surface/tray area of console assembly 102.

As may further be appreciated from FIGS. 2A and 2B, and as alluded to above, platform 202 may comprise a plurality of positions to accommodate both wired/corded and wireless charging of a mobile device(s) being held by multi-position device holder 200. For example, platform 202 may further include a first sub-platform 202a which can accommodate wireless charging of a mobile device 210 in a first position A. This first position A may be tilted at an angle of approximately 35 degrees relative to the aforementioned vertical y axis. It should be understood that the particular angle of tilting can vary based on console assembly 102 size, orientation, layout, etc., size of the mobile device(s) seeking to be accommodated by multi-position device holder 200, and so on.

Platform 202 may also include a second sub-platform 202b which can accommodate wired charging of mobile device 210 in a second position B. As illustrated in FIG. 2B, an example tilt angle relative to the vertical y axis can be approximately 45 degrees. The greater tilt angle may serve to distance a rear surface of mobile device 210 resting on/atop second sub-platform 202b from wireless charging circuitry 207 disposed at or within back rest 206. In this way, when charging mobile device 210 using a cord, the wireless charging circuitry of mobile device 210 will not interact with wireless charging circuitry 207 of multi-position device holder 202. Moreover, second sub-platform 202b, which allows for a more horizontal position of mobile device 210 can provide better stability under certain vehicle use conditions or scenarios. For example, during acceleration, the forces acting on mobile device 210 can be better countered or at least mitigated with a greater positional angle relative to the vertical y axis.

As also illustrated in FIG. 2B, multi-position device 200 may be configured to have a particular height that provides clearance for mobile devices held therein. In some embodiments, an overhanging portion or "eave" of console assembly 102, the underside of instrument panel 106, etc. may define a height boundary relative to multi-position device holder 200. In the example embodiment illustrated in FIG. 2B, a minimum of approximately 13 mm clearance between the top of a mobile device held by multi-position device holder 200 may be effectuated. In some embodiments, multi-position device holder 200 may include an upper section itself. Similarly, the height of platform 202, e.g., between sub-platforms 202a and 202b, may be approximately 15 mm. This height may provide sufficient clearance to accommodate the connection portion 212a of a charging cable 212. Again, use of a cable or wire channel 204 allows the charging cable 212 to be connected to mobile device 210 without bending or stressing the connection portion 212a or charging cable 212.

It should be understood that the aforementioned dimensions, and other dimensions herein are examples and not meant to be limiting. It should be appreciated that the interiors of vehicles can differ greatly in terms of size, layout, features/functionality. Moreover, vehicle manufacturers may wish to accommodate all or only certain mobile devices, and mobile devices similarly vary in terms of size, dimensions, and shapes. Accordingly, variations in the dimensions or particular configurations of multi-position device holder 200 are contemplated.

Figure 3A:
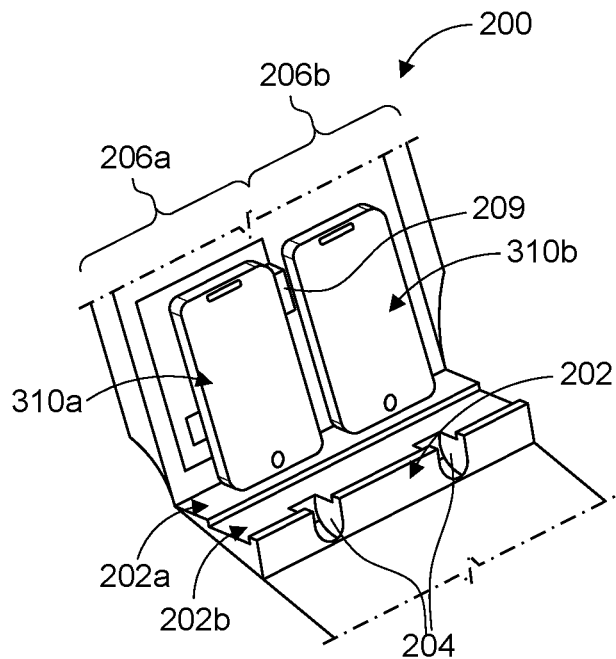
FIG. 3A illustrates example usage of the multi-position device holder of FIG. 2A in accordance with one embodiment.

FIG. 3A illustrates an example use case scenario involving multi-position device holder 200. As illustrated in FIG. 3A, a first mobile device 310a may be deposited on multi-position device holder 200 in first section 206a. In this example, first mobile device 310a may rest on the first sub-platform 202a. While resting on first sub-platform 202a, first mobile device 310a may be wirelessly charged (recalling first section 206a (FIG. 2A) may be configured with wireless charging circuitry 207. A second mobile device 310b may be deposited on multi-position device holder 200 in second section 206b. In this particular embodiment, multi-position device holder 200 may not be configured to have wireless charging circuity in second section 206b. Because second mobile device 310b is not being charged, second mobile device 310b can also be disposed atop second sub-platform 202b for an alternative viewing angle. Divider rib 209 may provide separation between first mobile device 310a and second mobile device 310b, as well as provide stability (e.g., assist in keeping mobile devices 310a and 310b upright/in the portrait orientation).

Figure 3B:
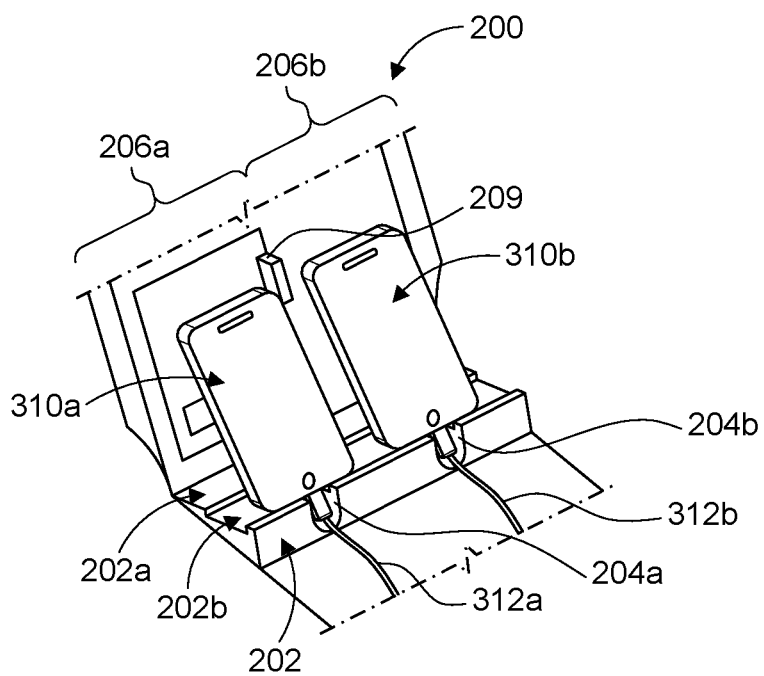
FIG. 3B illustrates example usage of the multi-position device holder of FIG. 2A in accordance with one embodiment.

FIG. 3B illustrates an example use case scenario involving multi-position device holder 200. As illustrated in FIG. 3B, first mobile device 310a may be deposited on multi-position device holder 200 in first section 206a, and second mobile device 310b may be deposited in second section 206b. In this example, both first mobile device 310a and second mobile device 310b may rest on the second sub-platform 202*b*. While resting on second sub-platform 202*b*, one or the other, or both the first mobile device 310*a* and second mobile device 310*b* may be charged using respective charging cables 312*a* and 312*b*. Charging cables 312*a* and 312*b* may be routed from respective mobile devices 310*a* and 310*b* through channels 204*a* and 204*b*. It should be noted that when disposed in this manner, again, it is not mandatory that charging of a mobile device(s) occurs. Although not necessarily encouraged, for safety reasons, depending on the configuration, location/placement of console assembly 102, multi-position device holder 200 may afford certain improved viewing angles for a mobile device(s) held therein. Divider rib 209 may provide separation between first mobile device 310*a* and second mobile device 310*b*, as well as provide stability (e.g., assist in keeping mobile devices 310*a* and 310*b* upright/in the portrait orientation).

Figure 3C:
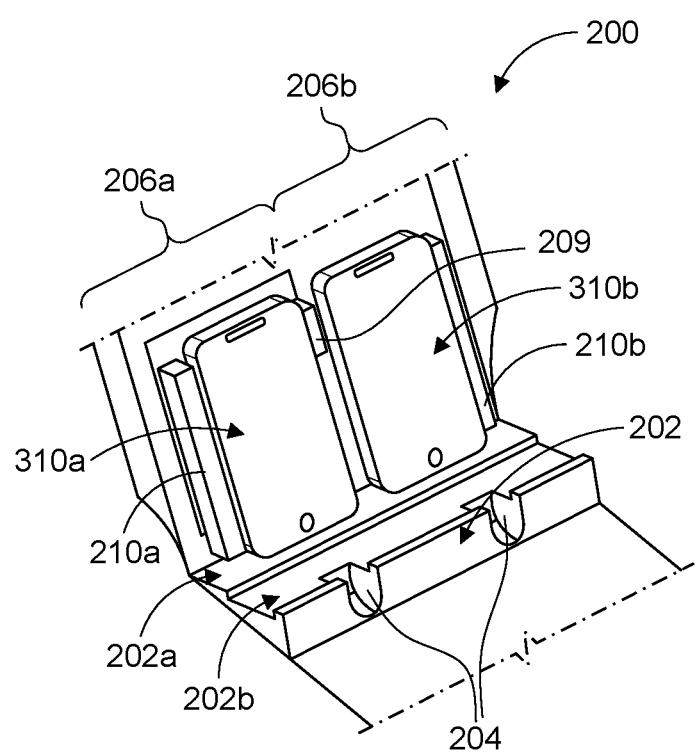
FIG. 3C illustrates example usage of the multi-position device holder in accordance with one embodiment.

FIG. 3C illustrates another embodiment of multi-position device holder 200. As illustrated in FIG. 3C, in addition to divider rib 209, additional support in the form of side stabilizers 210*a*, 210*b* may be provided as part of multi-position device holder 200. Like divider rib 209, side stabilizers 210*a*, 210*b* may vary in shape, size, position. In some embodiments, side stabilizers 210*a*, 210*b* may be adjustably positioned, e.g., vertically or horizontally (y or x axis, respectively, of FIG. 2B). In some embodiments, the size of side stabilizers 210*a*, 210*b* may be shortened and movable in the vertical direction so as not to impede holding a mobile device in a landscape/horizontal orientation as illustrated, for example, in FIGS. 4A, 4B. In some embodiments, side stabilization may be provided vis-à-vis edges or portions of console assembly 102.

Figure 4B:
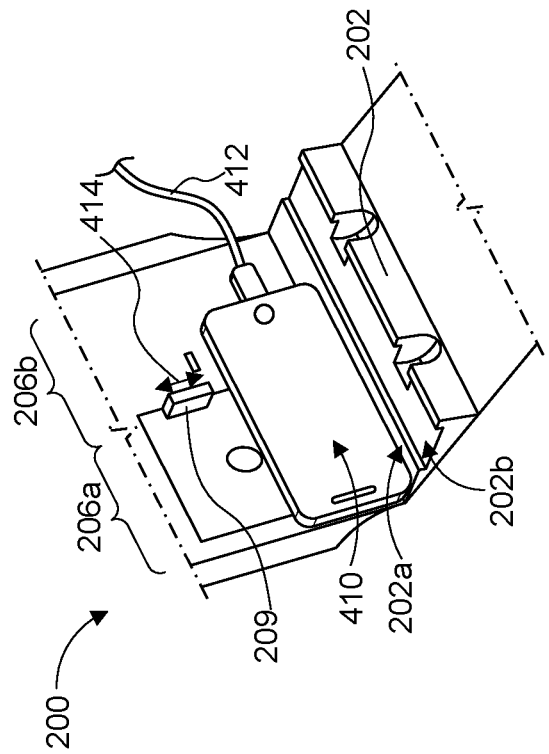
FIG. 4B illustrates example usage of the multi-position device holder of FIG. 2A in accordance with one embodiment.
Figure 4A:
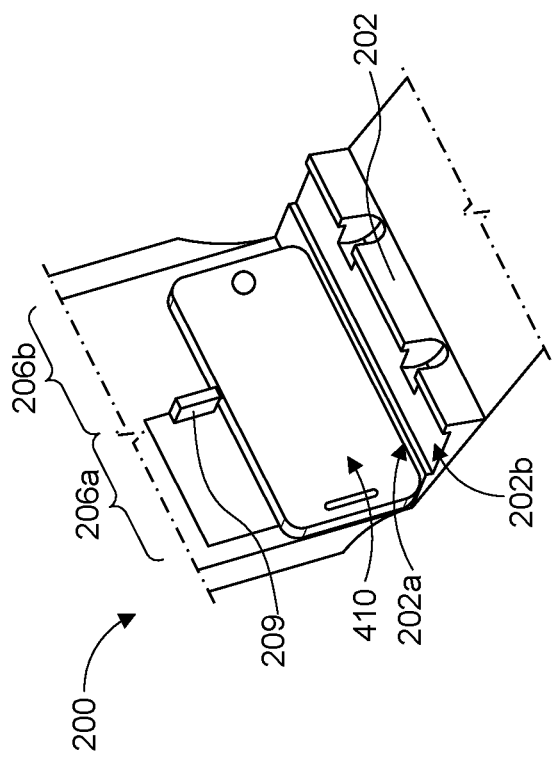
FIG. 4A illustrates example usage of the multi-position device holder of FIG. 2A in accordance with one embodiment.

FIG. 4A illustrates another use case scenario where a mobile device 410 may be disposed on multi-position device holder 200 in landscape orientation. It should be understood that in this embodiment, mobile device 400, when in the landscape orientation, may be large enough such that the length of mobile device 400 takes up space across both first and second sections 206*a* and 206*b* of backrest 206. It should be understood that in this orientation, the wireless charging circuitry of mobile device 410 may not necessarily coincide/line up with wireless charging circuitry 207 of multi-position device holder 200. However, depending on where the wireless charging circuitry of mobile device 410 resides, orienting or turning mobile device 410 180 degrees (still maintaining the landscape orientation) may allow the wireless charging circuitry of mobile device 410 to contact/line up with the wireless charging circuitry 207 of multi-position device holder 200.

Despite mobile device 410 being positioned in landscape orientation, divider rib 209 may still provide stability in maintaining the positioning/orientation of mobile device 410. Instead of the sidewalls of divider rib 209 contacting a side edge of a mobile device(s) in portrait orientation, a bottom wall of divider rib 209 may contact a side edge of mobile device 410.

It should be noted that in some embodiments, divider rib 209 may be integrated into multi-position device holder 200 as a movable element. For example, divider rib 209 may be attached through a slot(s) of multi-position device holder 200 such that the position of divider rib 209 can be adjusted up/down, side-to-side, etc. In this way different mobile devices and different orientations can be accommodated. As illustrated in FIG. 4B, which shows another use case scenario where a mobile device 410 may be disposed on multi-position device holder 200 in landscape orientation, divider rib 209 may be moved up/down, e.g., along the directions denoted by arrow 414. In this example use case scenario, mobile device 410 may be charged using charging cable 412. In other embodiments, divider rib 209 may be fixed, but optimally located so as to afford stability to mobile devices placed in/on multi-position device holder 200 both in portrait and landscape mode. For example, different versions of multi-position device holder 200 may be provided to accommodate certain models/families of mobile devices.

Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common s elements. Such a description shall not require or imply that separate components are used to implement such features or functionality.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle console assembly, comprising:
a device holder, comprising:
   a dual-position platform atop which one or more mobile devices rest;
   a back rest abutting at least one edge of the dual-position platform against which a rear surface or edge of the one or more mobile devices rests;
   at least two channels of the dual-position platform through which one or more cords, when connected to the one or more mobile devices, are routed; and
   a divider rib positioned between a first section of the back rest and a second section of the back rest stabilizing placement of the one or more mobile devices on the device holder.

2. The vehicle console assembly of claim 1, wherein a first edge of the dual-position platform is canted towards the back rest.

3. The vehicle console assembly of claim 1, wherein the dual-position platform comprises a first sub-platform configured to angle the one or more mobile devices such that at least one surface of the one or more mobile devices abuts the back rest.

4. The vehicle console assembly of claim 3, wherein a first section of the back rest includes wireless charging circuitry adapted to wirelessly charge one of the one or more mobile devices when the at least one surface of the one or more mobile devices abuts the first section of the back rest.

5. The vehicle console assembly of claim 3, wherein the dual-position platform comprises a second sub-platform configured to angle the one or more mobile devices such that a side edge of the one or more mobile devices touches the back rest.

6. The vehicle console assembly of claim 5, wherein at least one of the at least two channels maintains alignment of the one or more cords when connected to the one more mobile devices.

7. The vehicle console assembly of claim 5, wherein the angle at which the side edge of the one or more mobile devices touches the back rest resulting from placement of the one or more mobile devices atop the second sub-platform is greater than an angle at which the at least one surface of the one or more mobile devices abuts the back rest resulting from placement of the one or more mobile devices atop the first sub-platform.

8. The vehicle console assembly of claim 1, further comprising side stabilizers positioned at a respective outer edge of each of the first and second sections of the back rest, parallel with the divider rib.

9. A device holder, comprising:
a canted platform atop which one or more mobile devices rest;
a back rest abutting at least one edge of the canted platform;
two channels of the canted platform, each of the two channels accommodating passage of a cord operatively connected to one of the one or more mobile devices; and
a divider rib subdividing the back rest into two sub-sections.

10. The device holder of claim 9, wherein the canted platform comprises a first sub-platform comprising a channel in which the one or more mobile devices rests in either portrait or landscape orientations.

11. The device holder of claim 10, wherein the two channels are disposed proximate to the first sub-platform to accept the passage of the cord when the one or more mobile devices rest atop the first sub-platform.

12. The device holder of claim 10, wherein the canted platform comprises a second sub-platform positioned between the back rest and the first sub-platform.

13. The device holder of claim 11, wherein a relative angle of the first sub-platform is different than a relative angle of the second sub-platform.

14. The device holder of claim 9, further comprising a plurality of side stabilizers positioned on either side of the divider rib at outer edges of the two sub-sections.

15. The device holder of claim 9, wherein at least one of the two sub-sections supports wireless charging via wireless charging circuitry embedded in the device holder.

* * * * *